INVENTOR.
LOTHAR ROBERT ZIFFERER

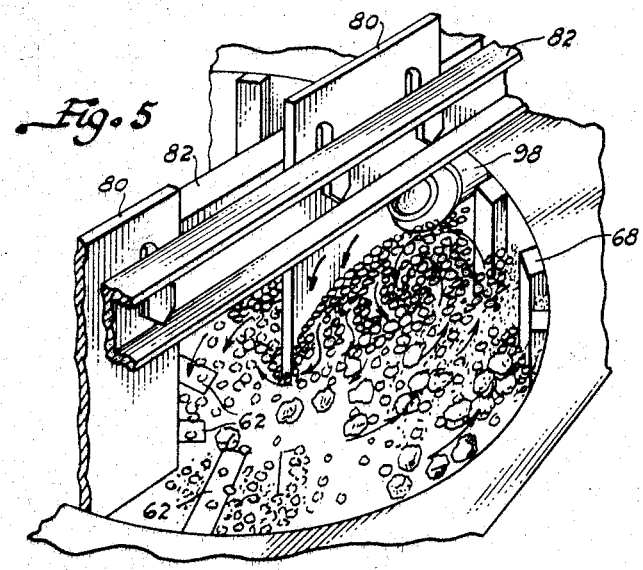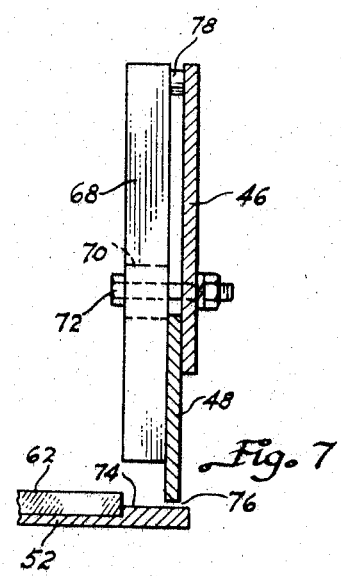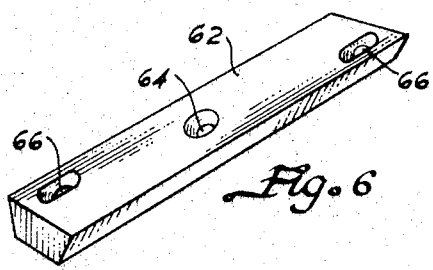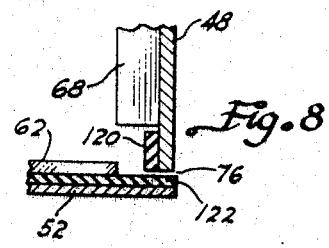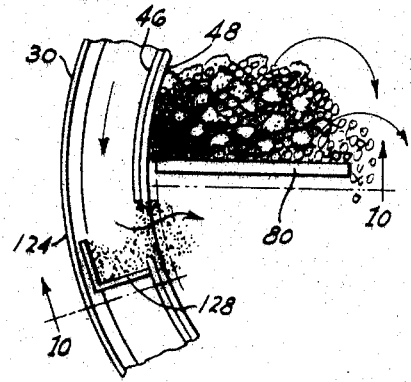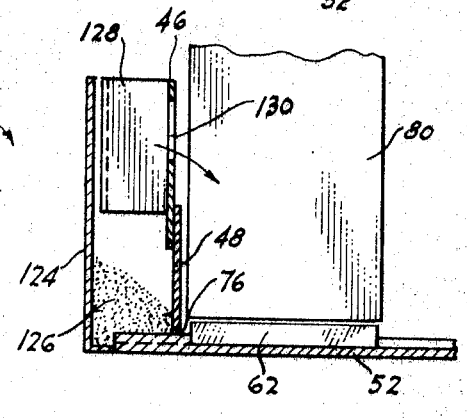

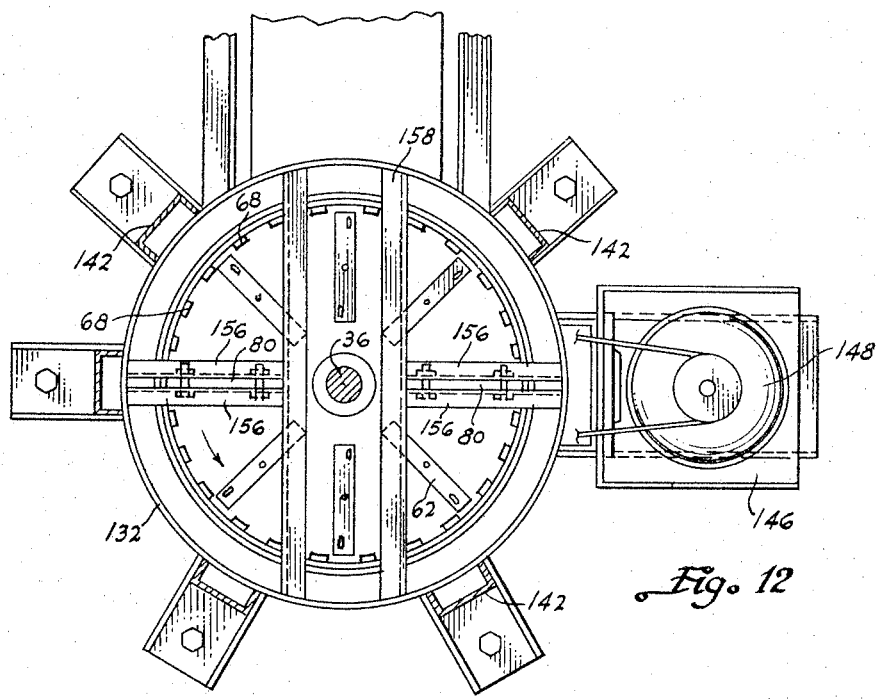
Fig. 12
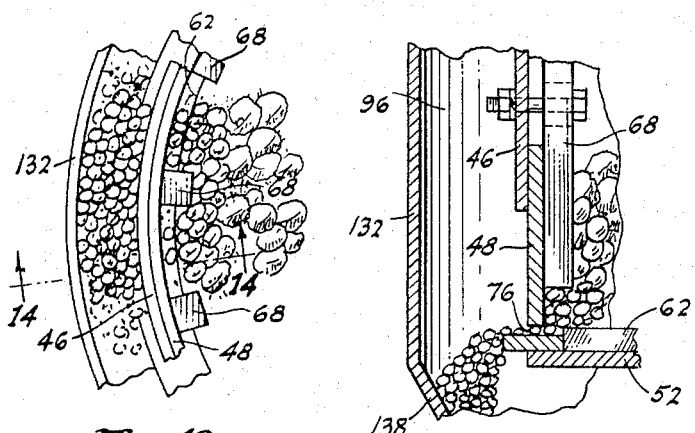
Fig. 13
Fig. 14

United States Patent Office 3,428,259
Patented Feb. 18, 1969

3,428,259
PROCESS FOR PULVERIZING MATERIAL
Lothar Robert Zifferer, R.D. 3, Glen Rock, Pa. 17327
Original application Jan. 9, 1964, Ser. No. 336,771, now Patent No. 3,300,151, dated Jan. 24, 1967. Divided and this application Sept. 26, 1966, Ser. No. 582,058
U.S. Cl. 241—5   1 Claim
Int. Cl. B02c *19/00, 17/00*

ABSTRACT OF THE DISCLOSURE

A process of pulverizing raw friable material by effecting frictional engagement between different portions of a layer of said material moving in a horizontal plane in a circular path about a vertical axis, changing the direction of said layer by having a portion of the material in said layer contact a stationary barrier during said circular movement thereof to cause a piling of a portion of the material to effect rubbing pressure upon a lower portion of said layer of material as it continues to move therebeneath in said circular path, continuously moving said piling material radially toward said axis, followed by radially accelerating the movement of said piling material outwardly against a relatively static layer of material adjacent the periphery of the pulverizing zone to cause additional reduction in size of said material, and continuously removing fine material of a desired size range from said mass being pulverized.

---

This application is a division of Serial No. 336,771, filed Jan. 9, 1964, entitled, Vortex Grinding Mill and Process, now Patent No. 3,300,151, issued Jan. 24, 1967.

This invention pertains to a process for pulverizing friable and preferably mineral material and several embodiments of grinding mill capable of performing said process are illustrated and described herein.

The reduction of raw, friable and particularly mineral material, either to powder size ranges or coarser, so-called gravel-type size ranges, has been performed for many years in many different types of mills, particularly ball and rod mills and many variations of these. In most mills of the types previously used for said purposes, the initial cost is great and very substantial abrasion occurs on the various working surfaces of the mills and any grinding implements, such as balls, rods, and the like, used therein to reduce the raw material in size to the desired finer ranges.

Another disadvantage encountered in using mills of this type has been that they have been restricted in their accommodation of feed size to produce a given end product.

One further disadvantage of most of the types of mills previously used for the above-described purposes has been the large power requirements per ton of product and consequent cost of operating the mill.

Still another disadvantage of the types of mills heretofore used has been the relatively large sizes thereof, especially where substantial volumes of product are desired, whereby the space factor in buildings containing the mills not infrequently presents problems. Large, heavy and expensive foundations also are required.

It is the principal object of the present invention to provide a process of pulverizing raw friable material by subjecting at least the larger size ranges of said material to shearing and crushing actions to effect initial reduction in size while producing a grinding action in the material so intially reduced in size by means of a frictional rubbing action of an autogenous nature between contiguous layers of said mass of material moving at different velocities and in different directions.

It is another object of the invention to produce high intensity grinding and crushing action upon such raw friable material through such frictional engagement of different bodies or layers of all sizes of the material within a mill and moving said different bodies or layers of material at different velocities and in different directions for grinding and crushing contact with each other, whereby such abrasion and frictional engagement, as well as certain high velocity impact of pieces and particles of said material against relatively static layers or zones of said material, results in even quite coarse, pebble-sized material, such as the product of a jaw crusher, being reduced to substantially any range of finer sizes desired, even of relatively fine powder size, with a minimum initial cost of the mill, minimum wear and abrasion on the mill, minimum consumption of powder, and a minimum size of the mill in contrast to currently used mills for producing similar products.

Still another object of the invention is to provide a process of pulverizing such friable, mineral material by causing a continuously fed mass of the same to be rotated in a substantially horizontal plane about a vertical axis, producing a semi-static layer of the material adjacent the periphery thereof, causing an abrupt directional change in the movement of a portion of said material to direct the same substantially perpendicularly to the rotating motion of still another portion of said material passing beneath said perpendicularly moving material, whereby the differences in velocity of said portions of the material, especially while moving in different directions, causes an intense grinding action between said masses of material with a minimum of abrasion being sustained by the mill.

It is a further object of the invention to perform the above-described processes within mills of a relatively simple nature which include a preferably circular table member rotatable around a substantially vertical axis adjacent the lower edge of a circular peripheral wall arrangement to confine material within the mill, in combination with one or more radially extending barrier plates spaced a predetermined distance above the surface of the table member and extending inward from the wall means, whereby as the table member revolves a certain mass of material fed thereto and moved thereby in a substantially circular path abruptly encounters said barrier plates and the direction of movement thereof is changed abruptly to form a vortex generating substantial internal pressure causing crushing and grinding of the material in the vortex mass and with a layer moved therebeneath by said table member, while additional material masses are thrown by radial acceleration against a semi-static layer of the material adjacent the inner surface of the circular wall means to produce substantial impact between said radially accelerated material and the semi-static layer thereof to effect further reduction in size of the material, all masses of material within the mill constantly being moved at different velocities of wide differences and in different relative directions to cause a constantly flowing grinding action of the material within the mill.

A still further object of the invention ancillary to the immediate foregoing object is to cause the various components of the several embodiments of mills to so handle the moving material that the various portions or masses of the entire body of material within the mill which move at the highest velocities or are subjected to the greatest impact are those which move relative to or are projected against semi-static layers of material covering surfaces within the mill, whereby said mill surfaces are subjected to a minimum amount of abrasive action and wear.

One further object of the invention which renders the process highly versatile comprises providing means within the mill by which the circular peripheral wall means of the mill may be adjusted vertically to dispose the lower edge thereof at different desired heights, depending upon the size range of product desired, relative to the periphery of the rotating table member and thereby vary the discharge space therebetween through which pulverized material passes in desired maximum product size, whereby, when the material has been reduced to such maximum desired size range, it is discharged with minimum wear upon the mill.

Details of the foregoing objects and of the invention, as well as other objects thereof, are set forth in the following specification and illustrated in the accompanying drawings comprising a part thereof.

FIG. 5 is a fragmentary perspective view showing an exemplary arrangement of the material within the mill and illustrating, by appropriate directional arrows, the general path of movement of at least certain portions of the material during the grinding thereof within the mill, and particularly the action afforded by the vertical barrier plates which cause a change in direction in the movement of certain portions of the material in the mill.

Figure 3:
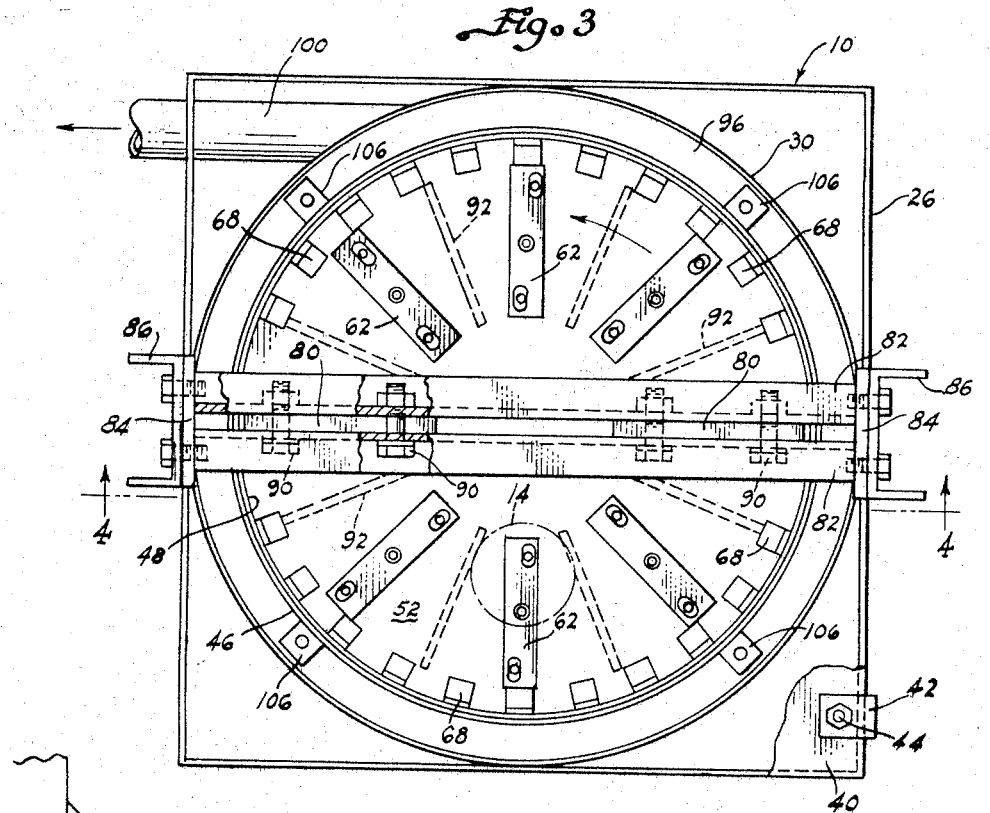
FIG. 3 is a top plan view of the mill unit per se of the system shown in FIGS. 1 and 2 with the top of the mill removed to illustrate certain details of elements contained within the mill, the scale of this figure being larger than employed in FIGS. 1 and 2.
Figure 4:
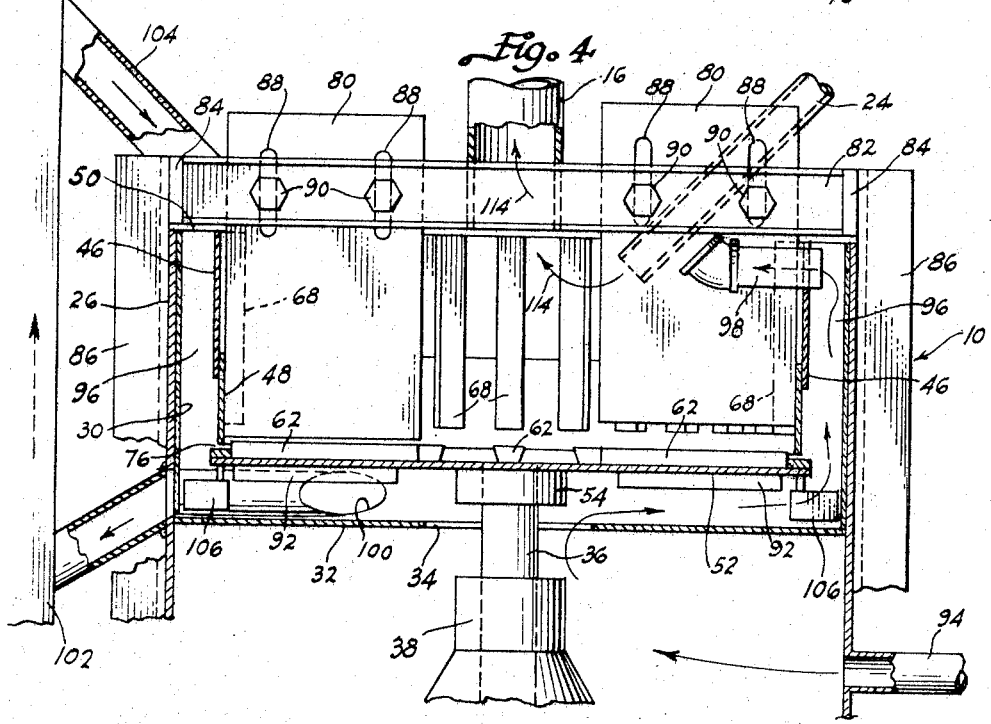
FIG. 4 is a vertical sectional view of the mill unit per se shown in FIG. 3, as seen on the line 4—4 of FIG. 3.

FIG. 6 is a perspective view of an exemplary radial impeller member of which a plurality are carried by the upper surface of the rotatable table member of the mill, as shown in FIGS. 3 and 4.

FIG. 7 is a fragmentary vertical sectional elevation of one side of the mill unit and illustrating the adjustability of the lower edge of the circular wall means relative to a fragmentarily illustrated peripheral portion of the rotatable table member.

FIG. 8 is a view similar to FIG. 7, but show in another embodiment of construction adjacent the annular discharge space between the lower edge of the circular wall means and the periphery of the rotatable table member, this embodiment especially being adapted for resistance to abrasion by material passing through said space.

FIG. 9 is a fragmentary top plan view of another embodiment of the general type of mill shown in FIGS. 1–7 and illustrating means by which a relatively fluid seal may be maintained between the circular wall means and the periphery of the rotatable table member.

FIG. 10 is a fragmentary vertical sectional view, as seen on the line 10—10 of FIG. 9.

Figure 11:
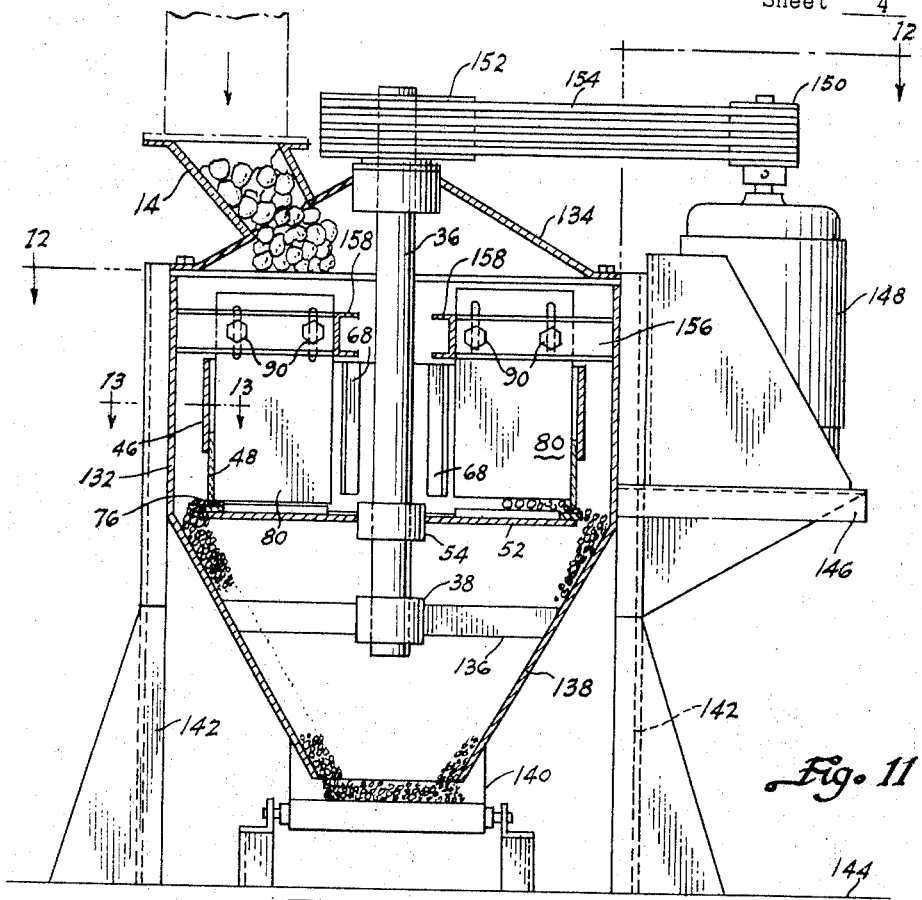

FIG. 11 is a vertical sectional view of another embodiment of mill system employing some of the principles of the system shown in FIGS. 1–7, but otherwise being provided with an overhead drive to permit discharge of product material through the annular discharge space between the circular wall means and rotatable table member and from which the material falls by gravity into appropriate discharge means with a minimum of interference by the mechanism for rotating the table member.

FIG. 12 is a sectional plan view of the mill system shown in FIG. 11, as seen on the line 12—12 of FIG. 11.

FIG. 13 is a fragmentary transverse sectional view showing details of the mechanism, as viewed on the line 13—13 of FIG. 11.

FIG. 14 is a fragmentary vertical sectional view of details of the construction shown in FIG. 13, as seen on the line 14—14 of FIG. 13.

Figure 15:
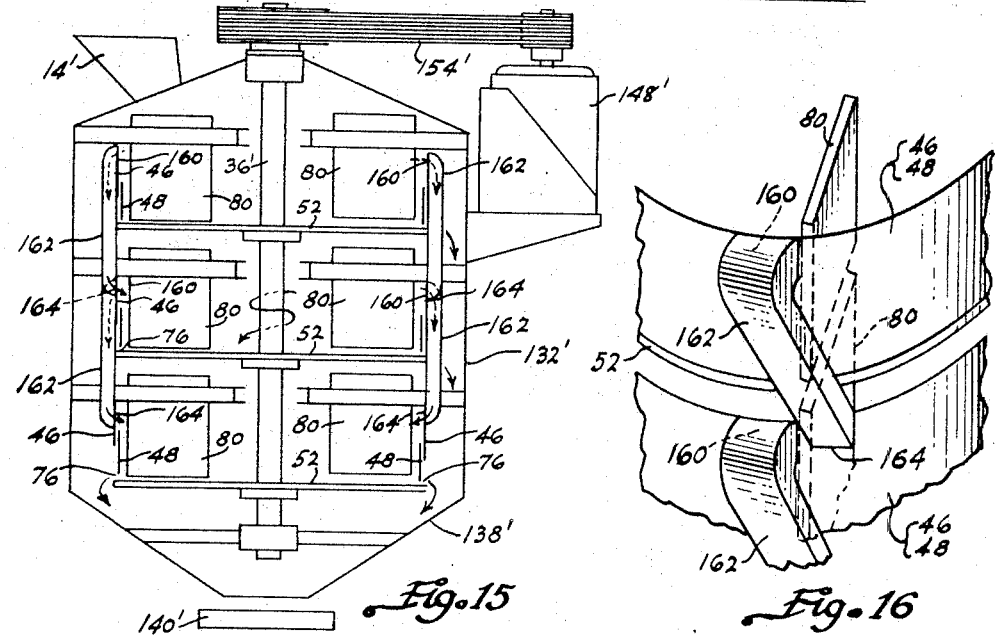

FIG. 15 is a somewhat schematic vertical sectional view of still another embodiment of mill having multiple units therein of the general type shown in FIGS. 11–14.

Figure 16:
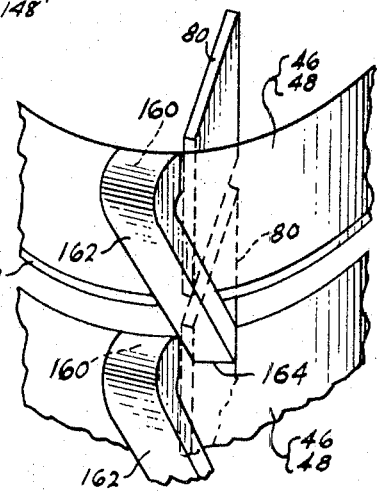

FIG. 16 is a fragmentary perspective view showing a detail of one of the mill units shown in FIG. 15.

General mill principles

Referring to the embodiment shown in FIGS. 1–7, the entire mill system for performing the processes of the present invention comprises a mill unit 10 per se which is operated preferably by an electric motor 12 of suitable horsepower rating. Material to be pulverized is introduced through inlet means 14 and relatively fine size range product material, which is capable of being airborne, is removed through discharge conduit 16, by suction induced by blower means within a suitable, diagrammatically illustrated air classifier 20.

To provide an adequate air stream for the interior of the mill 10, preferably, another blower 22 is provided with the discharge thereof connected to an air delivery conduit 24, which communicates with the upper end of mill 10. It is to be understood that the arrangement specifically illustrated in the overall system shown in FIGS. 1 and 2 primarily is exemplary for purposes of showing one form of mill system arrangement capable of performing the various process operations comprising part of the present invention. While a suitable overall system is essential to the successful operation of the mill 10, the present invention, nevertheless, primarily concerns details and principles of the mill 10, per se, which will now be described.

Figure 1:
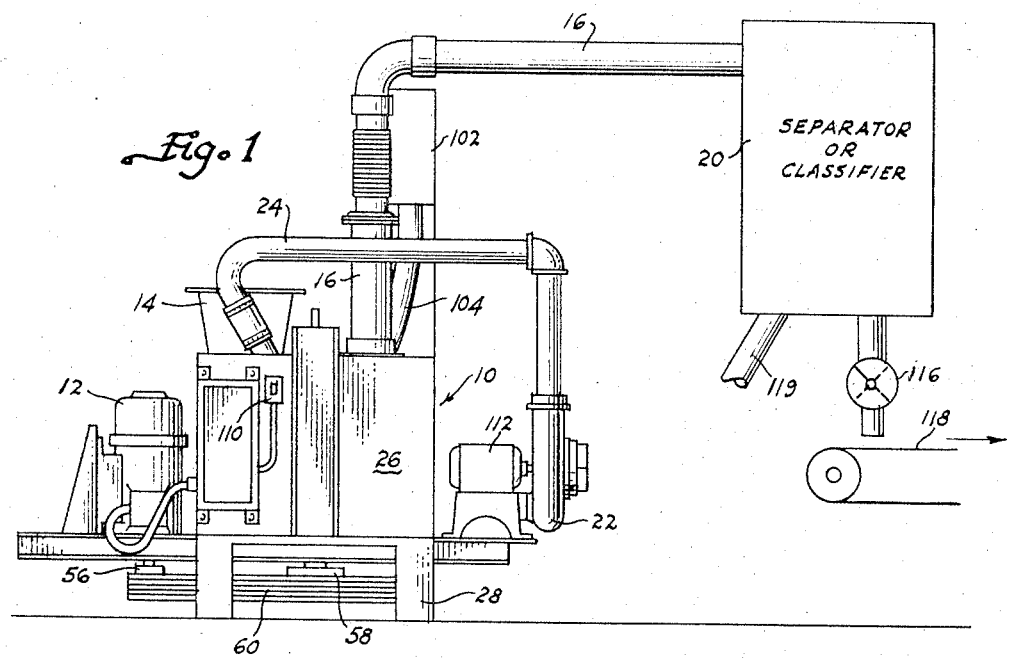
FIG. 1 is a side elevation of one embodiment of mill capable of performing the process comprising the present invention and illustrating a substantially complete mill system for performing such processes.

Referring to FIGS. 3 and 4 particularly, the mill 10 comprises an outer casing 26, which preferably is formed from sheet steel of suitable gauge and is supported by appropriate frame means 28 depending from the casing 26, as shown in FIG. 1. Such simple construction contributes to the relatively low cost of the mill, as compared with existing types of mills intended to perform similar operations, but which are very substantially larger in size, and correspondingly more expensive in cost, such as rod mills, ball mills, and the like. The overall weight of the present mill, as well as its size, likewise is much lower than these corresponding characteristics of existing mills having no greater production capacity, especially on a time basis, than the present mill comprising the invention.

The mill illustrated in FIGS. 1–7 primarily is for purposes of making product material of very fine size ranges, generally of powder-like consistency, from relatively coarse, raw, friable material, generally of a mineral nature, though not restricted thereto, of a type normally produced, for example, by a primary crushing operation, such as in jaw crushes, and the like. By way of example, but without restriction thereto, raw material up to 3″ size is handled readily by mills of the type illustrated in said figures. Such material may be fed continuously by conveyor or other suitable means into the inlet 14 of the mill, such delivery means not being illustrated specifically in order to simplify illustration.

Mounted within the mill casing 26 is a preferably cylindrical, stationary shell 30, which may be made of similar sheet steel, such as that which forms casing 26. Such shell is secured suitably to the casing 26. With reference to FIG. 4 particularly, the shell 30 preferably extends about the central vertical axis of the mill, but is not co-extensive in vertical dimension with the casing 26 because the primary function of shell 30 is to confine at least some of the material discharged from the mill interior, as is described in detail hereinafter. Extending across the lower end of stationary shell 30 is a bottom plate 32 having a central opening 34 therein of substantial size through which a vertical drive shaft 36 extends from suitable bearing means 38.

Figure 2:
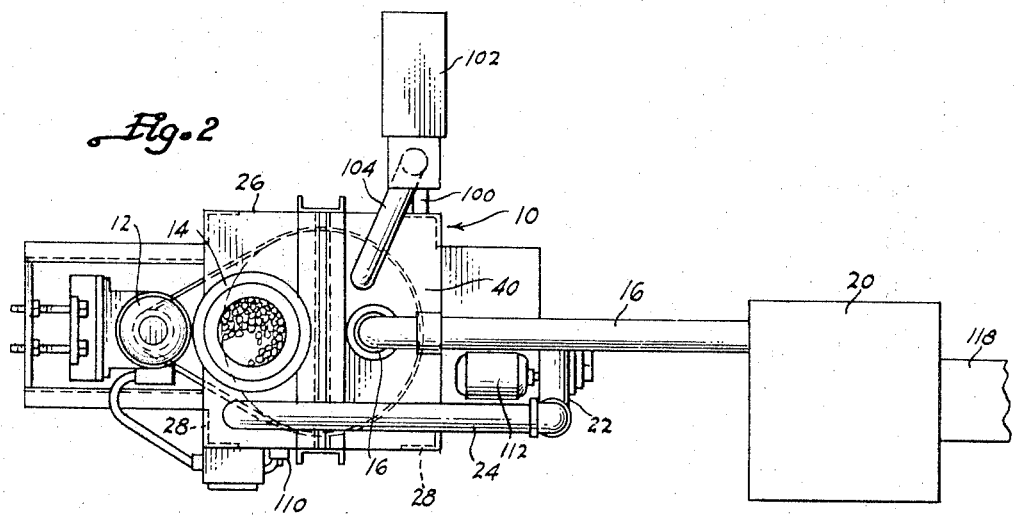
FIG. 2 is a top plan view of the mill system shown in FIG. 1.

The top of casing 26 is closed by a cover plate 40, only a fragmentary portion of which is shown in FIG. 3, the cover otherwise being shown in FIG. 2. Appropriate clamping brackets 42 are mounted adjacent each corner of the casing 26, for example, and by means of suitable bolts 44 threaded through brackets 42 into engagement with the top 40, the top may be secured in relatively air-tight condition over the upper end of casing 26.

Supported within the stationary shell 30 and coaxial therewith, but preferably spaced radially inward a predetermined distance, is a circular wall means preferably comprising an upper circular wall member 46 with which is slidably associated, in overlapping relationship, a lower, vertically adjustable circular wall member 48. The upper member 46 is fixed by any suitable means, such as by bracket means 50, see FIG. 4, to which member 46 is welded, for example. The wall members 46 and 48 preferably are formed from sheet steel of relatively heavy gauge.

Supported by the upper end of drive shaft 36 is a circular table member 52, which is driven by shaft 36, to which it is suitably clamped by hub 54, see FIG. 4. Driving of shaft 36 by motor 12 is accomplished by any suitable means, such as the exemplary multiple sheaves 56 and 58 respectively carried by the drive shafts of motor 12 and the lower end of shaft 36, such sheaves being connected by multiple flexible belts 60. The sheaves 56 and 58 are of a selected diameter so as to afford suitable speed reduction between motor 12 and the operational speed desired for table member 52.

Suitably secured to the upper surface of table member 52 are a plurality of radially extending impeller members 62, one preferred specific example of which is illustrated in detail in FIG. 6. From this figure, it will be seen that members are elongated and the opposite side surfaces thereof both preferably slope downwardly and inwardly so as to resemble a dovetailed configuration in cross-section, as shown at the end of said members in FIG. 6, as well as in FIG. 4.

The members 62 preferably are formed from abrasion-resistant material, such as certain suitable metallic alloys normally employed in various types of mills. Relatively simple connecting means are employed, such as a series of three bolt holes which are cast or otherwise formed in the members 62, the central hole 64 preferably being circular in cross-section, while the end holes 66 preferably are somewhat elongated to provide for variations in the formation of the members 62, especially by a casting or molding process. The upper ends of the holes 64 and 66 preferably are chamferred so as to receive bevel headed connecting bolts of suitable size, which extend through appropriate holes in the table member 52.

One of the advantages of the particular arrangement of the holes 66 in the members 62 is that, as will be seen from FIG. 6, the line of holes is diagonal relative to opposite corners of the members 62, whereby, if the leading surface and edge of the members 62, in the direction of rotation of the table 52, as indicated by the arrow in FIG. 3, becomes worn, the members 62 readily may be reversed by rotating them about the axis of hole 64 180° and then re-connecting the members to the table member 52. As will be seen particularly from FIGS. 3 and 4, the impeller members 62 are spaced at the opposite ends thereof respectively from the periphery of table member 52 and the central axis of said table member.

Arranged around the inner surface of the composite circular wall means comprising members 46 and 48 is a plurality of, preferably circumferentially evenly spaced, material impeding members 68. The members 68 preferably are formed from abrasion-resistant material similar to that from which the impeller members 62 are formed, for example. The impeding members 68 preferably are disposed vertically, parallel to each other and also to the axis of the mill. Intermediately of the ends thereof, they are provided with a slot 70 of limited length to receive a clamping bolt 72, which also extends through a suitable opening in the upper circular wall member 46, as best shown in FIG. 7.

There are two primary functions served by the impeding members 68. The principal one of these is to impede or retard the movement circularly of a layer of material being ground which accumulates between the members 68 and against the inner surfaces of the wall members 46 and 48, details of which are described more extensively hereinafter. The second function is to serve as clamping means for the vertically adjustable lower wall member 48. From FIG. 7 particularly, it will be seen that the upper portion of the lower wall member 48 is clamped between the lower portion of the upper wall member 46 and the inner surfaces of the impeding members 68. Such clamping of the lower wall member 48 is accomplished after the lower edge thereof is disposed a desired distance above the upper peripheral surface 74 of table member 52, to provide an annular discharge space 76. Clamping of lower wall member 48 in adjusted position also is facilitated by the employment of small spacing members 78 disposed between the upper end of members 68 and the inner surface of upper wall member 46, but such spacing means are not absolutely essential to effect satisfactory clamping.

A very important aspect of the present invention comprises the provision of radially and vertically extending barrier plates 80, which are disposed within the confines of the circular wall means 46, 48. As best shown in FIGS. 3–5, a pair of diametrically opposed barrier plates 80 is illustrated, but it is to be understod that the invention is not to be restricted to a use of any specific number of such plates. However, in the preferred method of operating the mill to achieve the desired process, whatever number of such plates is selected for operation should be disposed in circumferentially evenly spaced relationship to each other. As a result of this, as well as other structural features of the mill, it operates substantially without vibration, whereby no abnormal floor preparation or construction is required other than to be adequate to support the weight of the mill and contents.

It will be seen especially from FIGS. 3 and 4 that the barrier plates 80 extend substantially from the inner surfaces of the circular wall means 46, 48, radially inward toward the axis of the mill, but spaced from said axis an appreciable distance, for purposes to be described hereinafter. Any suitable means may be used to support the plates 80, but it is preferred that the same be supported adjacent the upper ends thereof, whereby the plates 80 extend downwardly for preferably adjustable positioning of the lower edges thereof a desired distance above the upper surfaces of impeller members 62.

The specifically illustrated supporting means for the plates 80 in the exemplary illustrations of FIGS. 3–5 comprise a pair of opposed channel members 82 which extend diametrically across the upper end of the casing 26 and above the upper edge of upper wall 46. The ends of the supporting channel members 82 have welded or otherwise suitably affixed thereto appropriate connecting plates 84, which are securely bolted to the upper ends of vertical supporting members 86, which are suitably secured, for example, to the exterior surfaces of opposite sides of the outer casing 26.

It will be seen that the inner, opposed faces of the supporting channel members 82 are spaced sufficiently to receive therebetween the barrier plates 80. Said plates are provided in the upper portions thereof with vertical slots 88 of limited length for receiving therethrough clamping bolts 90, which extend through appropriately aligned holes in the channel members 82, as best illustrated in FIGS. 3 and 4.

Depending upon the type of material being ground, the rate of reduction thereof, the desired feed capacity, and other similar factors, the plates 80 are adjusted suitably with respect to the table member 52 and impeller members 62 thereon so as to provide maximum efficiency in reducing the material to the desired size range, after which it is discharged from the mill by one of several means, depending upon whether the material is of very fine size ranges and powder-like, or of coarser, so-called gravel size of the order of ⅛″ and larger, for example.

In regard to the specific arrangement of a pair of diametrically opposed barrier plates 80, it will be seen from FIG. 4 particularly that the right-hand plate 80 is positioned with its lower edge adjusted a greater distance above the upper surface of impeller members 62 than the lower edge of the left-hand plate 80. This is due to the position of the inlet means 14 with respect to the two plates 80. By referring to FIG. 3, for example, wherein the inlet means 14 has been illustrated diagrammatically by a broken circle, with with regard to the direction of rotation of table member 52, as indicated by the arrows shown in FIG. 3, the newly introduced material will first contact the right-hand plate 80. Thus, if only a single inlet opening is provided, it has been found to be advantageous, especially to distribute the work within the mill evenly between the plates 80, for example, as well as with regard to the other elements of the mill, to have the right-hand plate spaced a greater distance above the table 52 than the left-hand plate.

Such difference in spacing is determined usually by inspection after operating the mill for a short period of time, especially if a different type of material is to be ground than that for which the mill was previously set, for example, or in the event the production rate is to be increased or decreased. Also, after a certain amount of experience of operating the mill, a skilled attendant frequently acquires working knowledge with respect to the desired settings of the plates 80 with respect to table 52 so as to produce maximum efficiency relative to operating the mill.

Also as seen from FIGS. 3 and 4, the table member 52 is spaced a limited distance above the bottom plate 32 of the stationary shell 30. The lower surface of table member 52 preferably is provided with a plurality of radially extending, substantially vertical vanes 92, which, as the table member is rotated by the drive shaft 36, will induce an air current to be drawn through air inlet 94, sweeping upwardly past the bearing means 38 and through the central opening 34, discharging upwardly through the cylindrical space 96 between the shell 30 and the circular wall means 46, 48.

In view of the fact that the cover plate 40 actually may comprise a pair of similar cover members respectively extending from the channel members 82 outwardly to the sides of outer casing 26, it will be seen particularly from FIG. 4 that said cover plates will close the top of the cylindrical space 96. Thus, in order not to impede the flow of air induced by vanes 92, one or more air discharge members 98, see FIGS. 4 and 5, may be employed to extend through the upper wall member 46 and into the interior of the mill so as to reintroduce to the mill any powdered material which may otherwise tend to accumulate upon the bearing means 38 and possibly impair the life and operation thereof.

Extending tangentially from the lower portion of the outer casing 26 is a material discharge conduit 100, the opening of which will be somewhat elliptical in shape, as viewed in FIG. 4. The outer end of the conduit 100 communicates with the lower portion of an elevator unit 102, as shown in FIG. 4, and the upper portion of the elevator is provided with a return conduit 104, which communicates appropriately with the upper portion of the interior of the mill as defined by the circular wall means 46, 48. If desired, the elevator 102 may first be arranged to deliver material from discharge conduit 100 to a suitable separator or a classifier for purposes of separating useful product from coarser sizes which may require further processing, and then only the latter material will be returned through conduit 104 to the mill.

Table member 52 also is provided adjacent the periphery thereof with a plurality of preferably circumferentially evenly spaced impeller members 106, which sweep the periphery of the space between table 52 and bottom plate 32 to ensure that any material exiting from the mill through the annular space 108 between the periphery of table member 52 and the lower edge of lower wall member 48 will be discharged into the conduit 100 for removal from the mill.

*Mill to produce fine, powder-like product material*

While the general construction principles incorporated in the embodiment of mill shown in FIGS. 1–7 can be employed with equal facility to produce intermediate or gravel-type size ranges of product material, said embodiment nevertheless primarily is adapted and arranged to produce much finer size ranges of powder-like consistency and the operation of the mill to produce this type of material now will be described.

As will be seen particularly from FIG. 4, the annular space 76 has been arranged, through suitable adjustment of the lower edge of the lower circular wall member 48 with respect to the periphery of table member 52, to be of very small size. Upon activation of motor 12 through starter switch 110, for example, see FIG. 1, rotation of table member 52 is initiated. Blower 22, which is operated by electric motor 112, also is started so as to introduce air into the mill interior, and the motor, not shown, which operates suction blower 18 of classifier 20, also is started by appropriate switch means. Raw, friable material which is to be reduced in size by the mill unit 10 is fed to the exemplary inlet means 14 by any appropriate mechanism, such as conveyor or otherwise.

The falling material engages the rapidly rotating table member 52 and impeller members 62, which fling said material with very substantial radial acceleration against the impeding members 68 and into the spaces therebetween defined by the circuit or wall means 46, 48. Rapidly, a layer of said material will be formed around the interior of the wall means 46, 48, and additional material impelled thereagainst by the impeller members 62 will effect a certain amount of rubbing and abrading with consequent reduction in size of the material, both in said layer as well as that which is impelled against said layer. Through gravity, and other forces, said layer, while semistatic at any given instant at which it is contacted by impelled material, nevertheless will gradually migrate and be replaced by additional material impelled thereagainst by the rotating table member 52.

Certain other portions of the mass of material within the mill will, at least momentarily, engage the upper surface of table member 52, especially between the impeller members 62, and be moved in a circular path thereby until at least part of such masses abruptly engage the stationary barrier plates 80, whereupon a rapidly moving and flowing vortex of the material is formed which exerts substantial grinding action, said material moving at least partially in a direction transverse to the direction of the material being moved in a circular path by table member 52, said material progressively being somewhat plowed or spilled from the outer edges of the barrier plates 80 toward the space between the inner vertical edges thereof.

As a result of the foregoing, substantial masses of material of a constantly flowing nature accumulate against the leading surfaces of the barrier plates 80 with respect to the direction of rotation of the table member 52 and the weight of this material, even though of a fluid nature, against the material being moved in a circular path by table member 52, as induced by impeller members 62, causes a very substantial grinding action between such differently moving masses.

Much of the grinding, crushing and abrading action caused in the vicinity of the vortex, which is somewhat diagrammatically illustrated in FIG. 5 through the use of directional arrows, undoubtedly is caused by differences in velocities, as well as rapid changes in directions of movement of certain portions or bodies of the mass of the material undergoing reduction. By removing the top of the mill and observing operation thereof, it will be seen that something quite similar to that illustrated in FIG. 5 takes place.

It also readily can be visualized that the mass of material progressively being brought into contact with the barrier plates 80 by the revolving table member 52 will not directly contact the leading surfaces of the barrier plates, but, rather, the newly oncoming material will contact material which has already been stopped with respect to its substantially circular path of movement by the barrier plates and the portion of the material in direct engagement with the barrier plates under such circumstances is undergoing relatively little movement, such movement as does occur appears to be substantially in a radially inward direction. Accordingly, relatively little severe abrasive action takes place between such masses of material and the leading surfaces of the barrier plates 80.

Inasmuch as the masses of material piling up adjacent plates 80 are constantly in a fluid condition of a vortex nature, they have no appreciable circular direction of movement within a horizontal plane. The material momentarily trapped between and impelled by the impeller members 62 of the rotating table member is subjected to a substantially circular movement, very much like what takes place in a grist mill, under such circumstances in the instant mill; the material formed in a vortex by the barrier plates 80 is caused to be abraded with and by that material which is being carried in such circular manner by the table 52 beneath the vortex masses. In addition, a certain amount of crushing action occurs between the lower edges of the barrier plates 80 and the impeller members 62 moving therebeneath.

As the material in the vortex shown in FIG. 5 first moves circularly with the rotating table 52 and some of the same is propelled with radial acceleration against the semi-static layer of material against the side wall means 46, 48, the engagement of said circularly moving material with the vortex masses causes the material to move radially inwardly, i.e., somewhat transversely to its previous circular movement, as shown by the arrows, and ultimately passes through the space between the inner edges of the barrier plates 80, whereupon the material will engage the rotating central portion of the table member 52. It will be visualized that the layer of material carried by said table between the impeller members 62 will be only of limited thickness as it emerges from the lower edge of the barrier plates 80, thereby readily being subjected to radial acceleration against the circular wall means 46, 48 and any layer of material of a semi-static nature disposed against said wall means.

Upon contacting the rotating central portion of table member 52, the mass of material constantly being spilled thereonto from the vortex shown in FIG. 5 likewise will be subjected to such aforementioned radial acceleration against the semi-static layer of material on the wall means for crushing impact action, as well as certain of the portions of this mass being moved somewhat in a circular path until said portions contact the vortex occurring adjacent the next engaged barrier plate 80.

The milling effect described above very rapidly reduces raw, coarse material of various sizes to desired fine size ranges in accordance with the setting of the annular space 108. Under conditions where said space is set to produce product material of powder-like consistency, as such product material is continuously produced within the mill, the air currents indicated by arrows 114, which are delivered to the interior of the mill through conduit 24, will entrain such powdered material and remove the same, by suction, through discharge conduit 16 for delivery to any suitable portion of the mechanism, such as air classifier 20. Depending upon the suction force utilized, it is conceivable that certain sizes of material will be entrained in the air currents discharged through conduit 16, which are larger than those desired for the product. Any such excess sizes so entrained can be separated from the desired size ranges by the classifier 20. One exemplary type of operation of separator 20 is to have the product of desired fine size discharged through air-lock type discharge 116, for example, onto an appropriate means, such as conveyor 118, for removal either to storage, suitable packaging, or further treatment, while oversize material exits through conduit 119 back to mill 10 for further reduction.

During the operation of the mill as described above, a certain amount of material, some of which may be larger than the desired product size ranges, will be discharged through the annular space 76 into the lower portion of cylindrical space 96. Such material rapidly is induced by the impelling action of revolving members 106 to be discharged through the tangential conduit 100 for delivery to elevator 102, for example, and, from there, either to a suitable separator, not shown, for removal of desired product size ranges and return of the oversize to the mill, or the entire mass of discharge material, which is received by elevator 102, may be returned through conduit 104 to the interior of the mill for further processing. Also, it is possible to produce fine product material of powder consistency ranges without using suction discharge. Instead, the annular space 76 is adjusted to be quite small, whereby all of the product discharges therethrough and removal through conduit 100 occurs in the manner described above, with subsequent return of oversize to the mill for further reduction.

While the mill is operating under the conditions described above, and even though the revolving table member 52 is supported by the lower bearing means 38, the sweeping of air past said bearing and upwardly through opening 34 into cylindrical space 96 will constantly keep any powdered or other extraneous material in the ambient atmosphere around bearing means 38 from harming the same. Any such material as is entrained within the air currents sweeping the bearing means 38 will be delivered to the interior of the mill through inlet means 98 as a result of the air currents induced by vanes 92 depending from the lower surface of rotating table member 52.

The production rate of the mill largely will be influenced by the hardness of the material being processed, the rate of production desired, and the power consumption cost desired to be maintained incident to operating the mill system, as well as possibly other factors. However, operation results have shown that mills of the type illustrated in the drawings and described above, which are of far less size and cost than other mills, such as rod type and ball type mills of vastly larger sizes and greater costs, can compete very favorably in production rates and with greatly improved operational costs. Further, reduction of the material by the mills comprising the present invention and in accordance with the process which said mills are capable of performing, requires a lower consumption of kilowatt hours per ton of material produced than by existing mills, especially of the rod and ball type. In addition, due to the methods of reduction employed in mills embodying the present invention, and especially the formation of layers of material which move at different velocities and in different directions with respect to each other while the mill surfaces are covered by said layers, only minimum abrasion of the operating surfaces of the mill components occurs.

Inasmuch as at least a certain amount of material will discharge through the annular discharge space 76 of the mill, it will be seen that in the event the material being processed is of a very abrasive nature, the surfaces of the mill components defining the annular space 76 will be subjected to substantial wear, especially in view of the relative movement occurring between the surfaces defining said space. Under such circumstanes, wear may be minimized by providing adjacent the inner surface of the lower edge portion of the lower wall member 48 a layer of yieldable, rubber-like material 120, shown in exemplary manner in FIG. 8, and the upper surface of table member 52 likewise is provided with a layer 122 extending beneath the lower edge of wall member 48 and layer 120 of similar material. If desired, the layer 122 may cover the entire upper surface of the table member 52, with the exception of the upper surfaces of impeller members 62. The rubber layers 120 and 122 may be secured to their supporting members by any convenient means, such as bolting, clamping, cementing, or the like. Further, the lower edge of layer 120 preferably should be at least coextensive with the lower edge of wall member 48.

This embodiment of mill which is capable of and otherwise is arranged to produce powder-type material for removal by suction means 16 also may be provided with a fluid seal means with respect to the annular discharge space 76. Referring to FIGS. 9 and 10, one exemplary type of fluid seal means is illustrated. Said seal means essentially comprises a cylindrical skirt 124, which extends upwardly a predetermined distance and surrounds at least the lower portion of the circular wall means 46, 48, as shown in FIG. 10 particularly. The lower edge of skirt 124 may be welded or otherwise secured to the periphery of table member 52, whereby an annular mass 126, which has been discharged through the space 76, will accumulate within the skirt, and, due to the powder nature of the material, it will effectively move slidably with respect to the lower edge of the lower circular wall member 48 and provide, in effect, a fluid seal between said wall and the rotating table member 52.

In the event an undue amount of the material 126 accumulates within the skirt 124, such excess readily may be returned to the interior of the mill through the use of appropriate means, such as a baffle 128, which is fixed appropriately to the stationary upper circular wall member 46 and, in effect, operates somewhat as a scoop which is engaged by the moving annular mass 126 of material, the velocity of the moving material thereby causing the excess material to move upwardly and through the discharge opening 130 into the interior of the mill. Such discharge takes place somewhat in the manner indicated by the arrows shown in FIGS. 9 and 10.

*Mill to produce intermediate, gravel-type material*

Another embodiment of mill system is illustrated in FIGS. 11–15, primarily for purposes of producing a gravel-type product which, for example, is of the order of approximately ⅛" in diameter and larger. However, this size designation is not to be considered restrictive, but, rather, an indication of a size definitely larger than powder-type material and readily capable of the individual particles thereof being seen with the naked eye, even at a reasonable distance. In the mineral dressing industry, particles of material of this size are sometimes referred to as an intermediate size range.

Though the embodiment illustrated in FIGS. 11–15 is adapted to form intermediate size ranges of material referred to as gravel-type, this embodiment of mill contains, to a very large extent, the basic principles included in the embodiment illustrated in FIGS. 1–7. Basically, it is primarily in regard to the discharge of material from the mill and the driving mechanism for the table member that this additional embodiment differs from the embodiment shown in FIGS. 1–7. Accordingly, similar reference characters for similar elements will be used to identify the same components of this additional embodiment as in the preceding embodiment of FIGS. 1–7.

Referring particularly to FIGS. 11 and 12, it will be seen that the mill comprises an outer casing 132, which has a removable, somewhat conical cover 134 connected to the upper edge thereof and extending thereacross, said cover being provided with an appropriate inlet means 14 through which raw, friable material is introduced to the interior of the mill from any suitable source, such as conveyor means, or the like. It will be seen that the drive shaft 36 extends upwardly from table 52, although the lower end of the drive shaft extends through an appropriate bearing means 38, which is supported by a spider 136. Said spider extends appropriately to and also is suitably connected to the sloping side walls of a discharge member 138 into which material exiting through the annular discharge space 76 falls by gravity for appropriate removal such as by means of a moving flexible belt 140, which is suitably supported beneath the lower, open end of the discharge member 138, or by any other appropriate means.

A plurality of supporting legs 142, spaced suitably around the periphery of the outer shell 132 and fixed thereto, maintain the mill unit per se in fixed relationship to a supporting surface, such as floor 144. Appropriate construction elements, such as steel channels, are highly suitable for purposes of serving as the legs 142. Also supported by one of said legs is an appropriate bracket frame 146 upon which the driving motor 148 is mounted and, through the expedient of multiple sheaves 150 and 152, respectively connected to the motor and drive shaft, the motor 148 rotates drive shaft 36 through the medium of a plurality of flexible belts 154.

In order to provide a suitable space for the drive shaft 36 to extend past the supporting means for the baffle plates 80, said plates are supported by radially extending pairs of spaced channel members 156, the outer ends of which are connected to the interior of casing 132, while the inner ends are suitably connected to diametrically extending, but transversely spaced, supporting members 158. The drive shaft, as is readily seen from FIGS. 11 and 12, extends between the spaced supporting members 158.

The circular wall means comprising upper member 46 and lower member 48 are similarly supported by corresponding members as in the embodiment of FIGS. 1–7 and the lower member 48 is vertically adjustable for the same purposes as the lower wall member 48 of said preceding embodiment in order to suitably space the lower edge thereof from the peripheral upper surface of the rotatable table member 52. However, the annular space 76 therebetween, as best shown in FIG. 14, wherein the scale is larger than in the preceding figures, is adequate to permit discharge of the product material therethrough and thus actually control the size of product material so discharged therethrough. Hence, for example, if material substantially ⅛" or greater is desired, the lower wall member 48 is adjusted with respect to the upper surface of the peripheral portion of table member 52 accordingly and is maintained in such adjusted position by being clamped by the impeding members 68 relative to the upper fixed wall member 46.

As can be viewed particularly from FIGS. 13 and 14, the material within the mill, which has been reduced to a size which will pass through the annular space 76, exits therethrough and falls by gravity from the periphery of revolving table member 52 into the discharge member 138. The larger sizes of material, which are illustrated in exemplary manner in FIGS. 13 and 14, are retained within the mill until they have been reduced to the desired maximum size for discharge through the annular space 76 as controlled by the dimension of said space.

Except as additionally and specifically described above with respect to certain details of the embodiment illustrated in FIGS. 11–14, the function of the other elements of said mill which are similar to those in the embodiment shown in FIGS. 1–7 can be presumed to be the same as those corresponding elements in the embodiment of FIGS. 1–7. This is particularly true with regard to the suitable spacing of the lower edges of the barrier plates 80 relative to the upper surfaces of the impeller members 62, the function of the impeller members, the formation of vortexes against the leading surfaces of the barrier plates 80, and the crushing, grinding and other pulverizing functions thereof resulting from various portions of the masses within the mill moving at different velocities and in different directions, as described in detail hereinabove relative to the embodiment of FIGS. 1–7.

Multi-unit operation

Particularly under circumstances where greater volumes of product are desired than normally would be readily capable of production by using a single mill of either of the types or embodiments described above, and without resorting to the use of a multiplicity of entire mill units, the present invention adapts itself readily to the provision of multiple grinding and pulverizing sections within a common shell, for example. Such an exemplary arrangement is shown diagrammatically in vertical section in FIG. 15, the basic structure primarily resembling the essential components of the mill illustrated in FIG. 11. The primary difference is in the arrangement of three exemplary grinding sections. Said sections are superposed above each other within a common outer shell 132', which, obviously, will have to be higher than the shell 132 of the embodiment shown in FIGS. 11 and 12.

Each of the grinding sections essentially comprises a rotatable table member 52, all of which preferably are commonly fixed to a single drive shaft 36', driven by motor 148', through suitable multiple sheaves and flexible belts provided at the upper portion of the mill, as clearly shown in FIG. 15. The lower end of the outer shell or casing 132' terminates in a conical discharge member 138' having an opening in the lower end thereof, for example, for suitable discharge such as onto a suitable diagrammatically illustrated conveyor belt 140'.

Associated with each of the rotatable table members 52 is circular wall means 46, 48, the lower wall member 48 being vertically movable relative to the stationary upper wall member 46. It will be understood that the mill sections also include barrier plates 80, which likewise are illustrated diagrammatically in FIG. 15. Also, though not illustrated for purposes of preventing the figure from being unclear, it will be understood that each of the mill sections likewise includes the circumferentially spaced impeding members 68 extending around the interior of the circular wall means 46, 48.

The discharge spaces 76 are set to produce either powder-type material or gravel ranges, as desired. When raw material is introduced into the inlet means 14', of the outer casing 132, shown in FIG. 15, it will first be received by the uppermost mill section and impelled by table member 52 thereof as described relative to FIGS. 11–14. The size of the product will be controlled by the setting of the annular discharge space 76, through which the product material will be discharged from the mill section. For maximum efficiency of the multiple unit operation, the rate of feed of the raw material will be in excess of the capability of the uppermost mill unit to grind to completion. Thereof, the excess will accumulate more than normally, with respect to the mill of FIGS. 11–14, against the upper portions of barrier plates 80. This accumulation is relieved by providing discharge openings 160 in the upper portions of the upper wall members of each mill unit adjacent the upstream or leading surface of each barrier plate 80, of suitable size to permit adequate discharge to prevent undue overloading of each mill unit.

Leading from each discharge opening 160 is a skewed conductor 162 extending downwardly and circumferentially forwardly for connection to an inlet opening 164 in the upper wall member 46 of the next lower mill unit adjacent the downstream surface of each barrier plate 80 thereof, there being ample space to discharge such overflow and incompletely ground material onto the table member 52 therein to cause impelling movement thereby of the nature described hereinabove. Thus the excess material from one mill unit is effectively, simply, and inexpensively discharged from one mill unit to the one below it, by gravity, while each mill unit performs its full share of grinding without being overburdened. Further, such stacked arrangement of the mill affords maximum compactness, thereby conserving space. It will be understood that the inlet openings 164 in the lower wall members 48 will be such as to permit adequate vertical adjustment of such members to permit varying the product discharge openings 76 adjacent the periphery of table members 52 for the purposes described above. The product material all drops by gravity from the discharge openings 76 of each mill unit within casing 132' onto discharge member 138' for removal from the mill by suitable means such as belt 140'. All table members 52 preferably are connected to and driven by a single drive shaft 36' which is rotated by the flexible drive means 154' operated by motor 148'.

It also will be understood that the discharge openings 76 of the various mill units may be adjusted to the sizes desired for the ultimate product and, as in regard to the various embodiments descirbed hereinabove, the various barrier plates 80 of each mill unit may be adjusted vertically, as desired, relative to each other to ahcieve maximum grinding efficiency in each mill unit.

Although the multi-unit mill system of FIGS. 15 and 16 does not include material classifying means specifically illustrated in said figures, it is to be understood that suitable classifying means such, for example, as the air classifier 20 of FIG. 1 can be utilized with the mill system of FIGS. 15 and 16. An appropriate conductor, such as belt 140' or suction conduit 16, may be used to feed material from the discharge member 138', for example, to such classifier, and appropriate conducting means, such as a conveyor belt 118 shown in FIG. 1, may be used to convey the oversize material from the classifier to the feed entrance of the mill system of FIGS. 15 and 16.

It is to be understood that the various embodiments of mills described hereinabove and especially the processes performed thereby are intended to be used with friable material in either dry or wet condition.

While the invention has been described and illustrated in its several preferred embodiments, it should be understood that the invention is not to be limited to the precise details herein illustrated and described, since the same may be carried out in other ways falling within the scope of the invention as claimed.

I claim:
1. A process of pulverizing raw friable material by grinding and crushing comprising the steps of:
 (a) effecting frictional engagement between different layers and portions of a mass of raw material of various sizes moving around a vertical while
 (b) constantly feeding raw material to the mass and withdrawing therefrom material of a desired range of sizes finer than the raw material,
 (c) moving one of said layers in a substantially circular path within a horizontal plane,
 (d) changing the direction of said layer by having a portion of the material thereof contact a stationary barrier during such circular movement thereof to
 (e) cause a piling of said portion of the material to effect rubbing pressure upon a lower portion of said layer of the material continuing to move therebeneath in said circular path and
 (f) continuously moving said piling material radially toward said vertical axis, followed by
 (g) radially accelerating movement thereof outwardly against a relatively static layer of material adjacent the periphery of the pulverizing zone to cause additional reduction in size of said material, and
 (h) continuously removing fine material of a desired size range from said masses being pulverized.

References Cited
UNITED STATES PATENTS

| | | | |
|---|---|---|---|
| 1,756,253 | 4/1930 | Lykken | 241—284 X |
| 2,130,064 | 9/1938 | Bucky | 241—5 |
| 2,752,097 | 6/1956 | Lecher | 241—19 X |
| 3,206,128 | 9/1965 | MacPherson et al. | 241—284 X |

ANDREW R. JUHASZ, *Primary Examiner.*

U.S. Cl. X.R.

241—19, 26, 257, 284